United States Patent
Coomer et al.

(10) Patent No.: US 7,558,052 B1
(45) Date of Patent: Jul. 7, 2009

(54) ELECTRICAL CABINET ASSEMBLY AND SEAL ASSEMBLY THEREFOR

(75) Inventors: Jarrod L. Coomer, Weaverville, NC (US); Michael H. Abrahamsen, Greenwood, SC (US); David A. Metcalf, Black Mountain, NC (US); Timothy Fair, Boiling Springs, SC (US); Stanley E. Moore, Weaverville, NC (US)

(73) Assignee: Eaton Corporation, Cleveland, OH (US)

( * ) Notice: Subject to any disclaimer, the term of this patent is extended or adjusted under 35 U.S.C. 154(b) by 21 days.

(21) Appl. No.: 11/972,307

(22) Filed: Jan. 10, 2008

(51) Int. Cl.
*H02B 11/00* (2006.01)
*H01H 33/02* (2006.01)

(52) U.S. Cl. .............. 361/608; 200/306; 218/155; 361/605; 361/611; 361/673

(58) Field of Classification Search ............ 200/306; 218/155–158; 361/606, 608
See application file for complete search history.

(56) References Cited

U.S. PATENT DOCUMENTS

| | | | |
|---|---|---|---|
| 3,301,972 A * | 1/1967 | Brumfield | 200/17 R |
| 3,980,845 A * | 9/1976 | Gryctko et al. | 200/50.15 |
| 3,983,460 A * | 9/1976 | Kuhn et al. | 361/626 |
| 4,002,864 A | 1/1977 | Kuhn et al. | |
| 4,002,865 A | 1/1977 | Kuhn et al. | |
| 4,017,698 A | 4/1977 | Kuhn et al. | |
| 4,194,100 A * | 3/1980 | Cox et al. | 200/50.15 |
| 4,528,164 A * | 7/1985 | Cooper et al. | 423/1 |
| 4,728,757 A | 3/1988 | Buxton et al. | |
| 4,769,739 A * | 9/1988 | De Bruin | 361/605 |
| 5,886,868 A * | 3/1999 | White et al. | 361/652 |
| 5,892,195 A * | 4/1999 | Aufermann et al. | 218/157 |
| 6,031,192 A | 2/2000 | Liebetruth | |
| 6,215,654 B1 * | 4/2001 | Wilkie et al. | 361/605 |
| 6,388,867 B1 | 5/2002 | Rakus et al. | |
| 6,563,062 B2 | 5/2003 | Kurano et al. | |
| 7,019,229 B1 | 3/2006 | Weister et al. | |

* cited by examiner

*Primary Examiner*—Gregory D Thompson
(74) *Attorney, Agent, or Firm*—Martin J. Moran

(57) ABSTRACT

A seal assembly for an electrical enclosure having a draw-out circuit breaker and a number of conductors is provided having a movable first seal member and a movable second seal member. The circuit breaker includes a protruding nose portion that is engaged by the first and second seal members in a manner that sealingly engages the nose portion. The arrangement of the first and second seal members and the nose portion provides for the sealing engagement to be maintained when the circuit breaker is moved from a first position in which the circuit breaker is not electrically connected to the number of conductors and a second position in which the circuit breaker is electrically connected to the number of conductors.

23 Claims, 6 Drawing Sheets

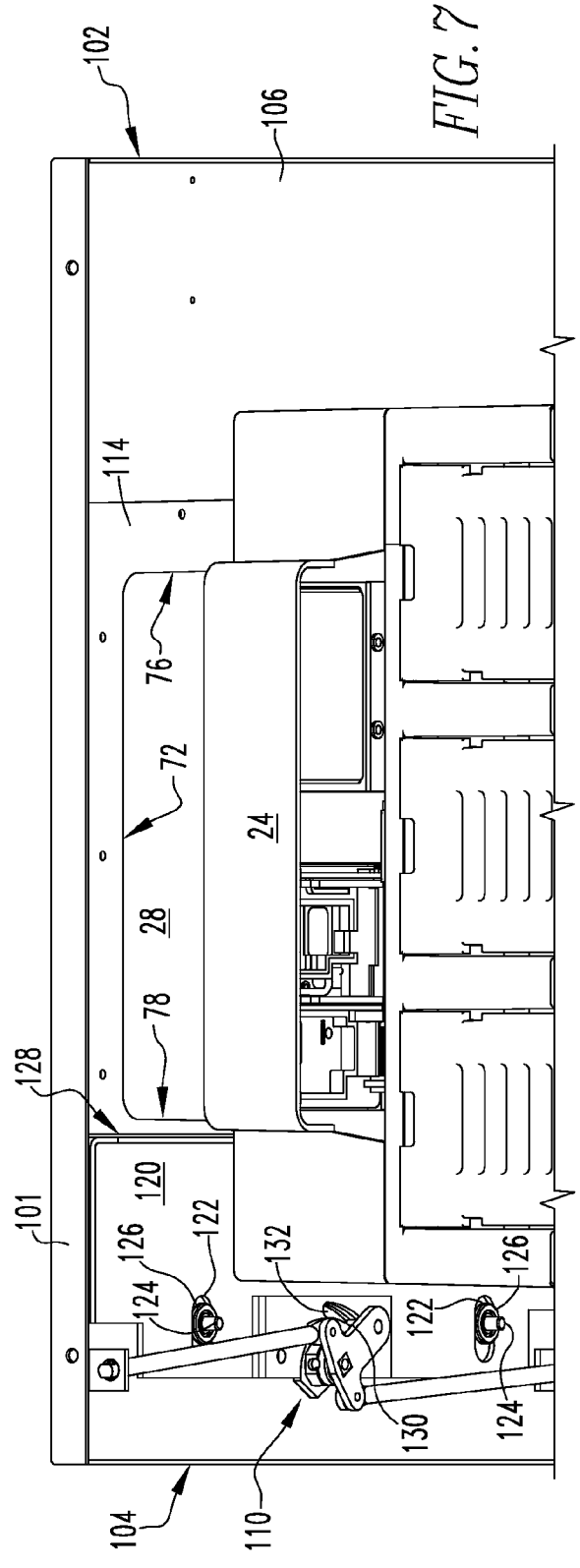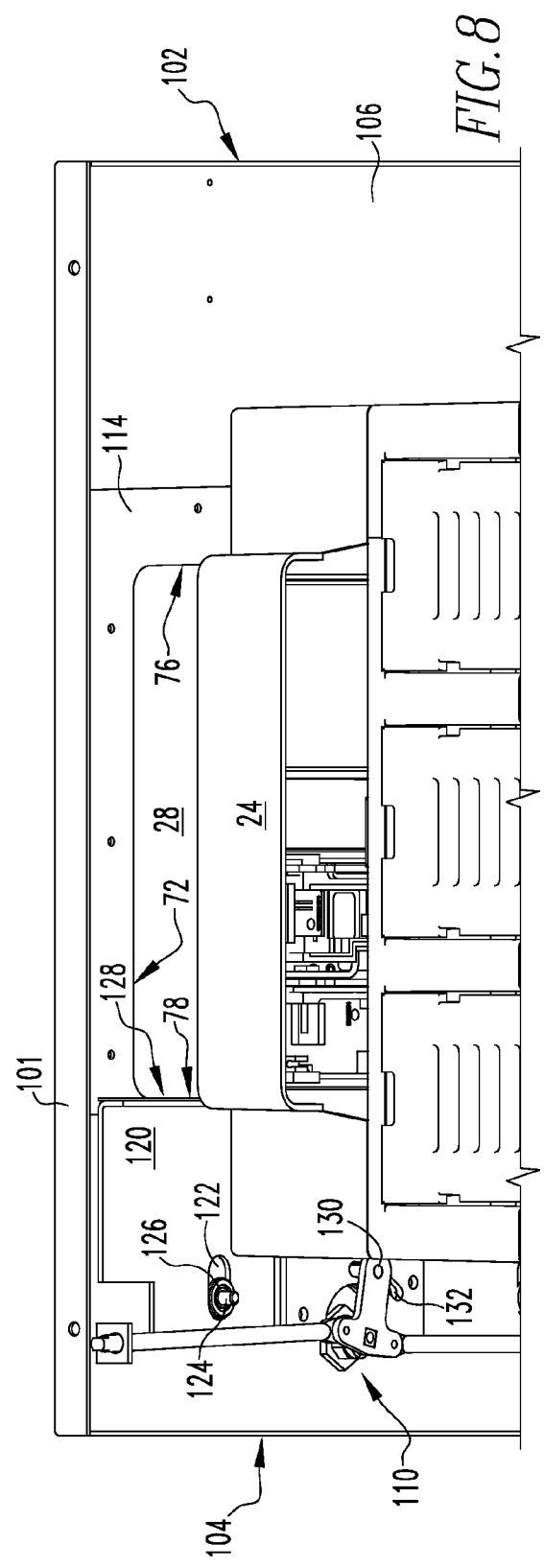

ELECTRICAL CABINET ASSEMBLY AND SEAL ASSEMBLY THEREFOR

BACKGROUND OF THE INVENTION

1. Field of the Invention

The invention relates generally to electrical switching apparatus and, more particularly to electrical enclosures for electrical switching apparatus, such as draw-out circuit breakers. The invention also relates to seal assemblies for electrical enclosures.

2. Background Information

Switchgear for electric power distribution systems includes electrical switching apparatus and their line and load terminations together with related equipment mounted in an electrical enclosure (typically a metal cabinet). Switchgear used in sections of electric power distribution systems operating at voltages up through 690 volts is classified as low voltage switchgear (according to international standards, although the ANSI standard for low voltage is a maximum of 600 volts). Typically, the electrical switching apparatus is a circuit breaker, but other switching apparatus such as, for example, network protectors, disconnect switches, and transfer switches are also mounted in such switchgear cabinets. Henceforth, the electrical switching apparatus will generally be referred to as circuit breakers, although it will be understood that other types of electrical switching apparatus can be used as well.

Typically, in such low voltage switchgear, multiple circuit breakers are mounted in each cabinet in cells stacked vertically in a forward compartment. The line and load conductors are mounted in rearward compartments and engage the circuit breakers through quick disconnects as the circuit breakers are installed in the cells.

Some electrical switching apparatus can be relatively large. In order to facilitate movement (e.g., installation; removal; maintenance), some circuit breakers are commonly coupled to draw-out mechanisms which permit such circuit breakers to be drawn out of the electrical enclosure. Accordingly, such circuit breakers are commonly known in the art as "draw-out" circuit breakers. Draw-out circuit breakers are described in further detail, for example, in commonly assigned U.S. Pat. No. 7,019,229, which is hereby incorporated herein by reference. See also U.S. Pat. Nos. 4,002,864; 4,002,865; 4,017,698; 4,728,757; 6,031,192; and 6,563,062.

The electrical enclosure for draw-out circuit breakers generally includes an outer structure having a top, bottom, rear and side walls, and a front access door or easily removable panel.

Circuit breakers are designed to trip in response to a trip condition (e.g., without limitation, an overcurrent condition; an overload condition; a relatively high level short circuit or fault condition). A high current fault interruption, for example, typically results in a substantial arc in the arc chamber of the circuit breaker. The arc forms rapidly expanding gases, and may generate flames and flying debris comprised of molten metal particles and fragments of various circuit breaker components.

Similar arcing can occur between adjacent conductors of different potentials, between an outboard line or load conductor and the switchgear cabinetry, and between the quick disconnects that are connected with the line and load conductors. Such arcing events are generally of greater magnitude and duration than those produced from fault interruption due to tripping of a circuit breaker. Such potential arcing events could result from a number of different scenarios such as, but not limited to: an operator leaving a tool in the switchgear prior to energizing the switchgear, an operator leaving a tool (or other object) on the back of a circuit breaker while racking the breaker onto a live bus, buildup of debris within the switchgear, animals entering the switchgear through venting holes and crossing a live bus, or some other type of unforeseen failure within the switchgear.

If the electrical enclosure is not sealed with respect to the circuit breaker, the arc gases and related debris can undesirably be expelled outwardly from the enclosure between the front access door and the circuit breaker, potentially causing injury to an operator or other person(s) adjacent the enclosure. Such arcing events are especially of concern during initial installation and racking of a circuit breaker by an operator.

One prior proposal for providing an arc resistant draw-out circuit breaker involves the use of a seal assembly including a seal between the circuit breaker and the electrical enclosure. However, known seal assemblies and/or seals therefor interfere with the ability to rack the circuit breaker in and out through the front access door.

There is, therefore, room for improvement in electrical switching apparatus, such as draw-out circuit breakers, and in electrical cabinet assemblies and seal assemblies therefor.

SUMMARY OF THE INVENTION

These needs and others are met by embodiments of the invention, which are directed to a seal assembly for an electrical enclosure housing an electrical switching apparatus, such as a draw-out circuit breaker.

In accordance with one aspect of the invention, a seal assembly is provided for a circuit breaker housed in an electrical enclosure having an interior and an exterior. The circuit breaker includes a nose portion having a first portion and a second portion. The seal assembly comprises a first seal member and a second seal member. The first seal member is structured to be movable from a first position wherein the first seal member is sealingly engaged with the first portion of the nose portion and a second position wherein the first seal member is spaced from the first portion of the nose portion. The second seal member is structured to be movable from a third position wherein the second seal member is sealingly engaged with the second portion of the nose portion and a fourth position wherein the second seal member is spaced from the second portion of the nose portion. When the first seal member is disposed in the first position and the second seal member is disposed in the third position, the seal assembly is structured to substantially seal all of the nose portion, thereby substantially sealing the interior of the electrical enclosure from the exterior of the electrical enclosure.

The electrical enclosure may include a number of conductors and the circuit breaker may be structured to be movable between a first position in which the circuit breaker is in electrical contact with the number of conductors and a second position in which the circuit breaker is not in electrical contact with the number of conductors. The seal assembly may be structured to substantially seal all of the nose portion of the circuit breaker when the circuit breaker is disposed at or between the first and second positions, thereby substantially sealing the interior of the electrical enclosure from the exterior of the electrical enclosure.

The first seal member may comprise a door member having a first end and an opposite second end with the first end of the door member being structured to be pivotally coupled to the electrical enclosure; and the second seal member may comprise a panel member slidingly coupled to the door member at or near the opposite second end of the door member. The nose portion may further have a first side, a second side, a top and a bottom. The first portion of the nose portion may be formed by the first side, the top and the bottom of the nose portion and the second portion of the nose portion may be formed by the second side of the nose portion. The door member may further comprise a latch mechanism at or near the opposite second end of the door member; the latch mechanism being structured to secure the opposite second end of the door member to the electrical enclosure. Movement of the second seal member from the third position to the fourth position may be determined by the latch mechanism. The door member may further comprise an opening through which the nose portion of the circuit breaker protrudes when the door member is in the first position.

Alternately, the first seal member may comprise a first door member having a first end and an opposite second end, the first end of the door member being structured to be pivotally coupled to the electrical enclosure; and the second seal member may comprise a second door member having a first end and an opposite second end, the first end of the second door member being structured to be pivotally coupled to the electrical enclosure. The first door member may comprise a latch mechanism at or near the opposite second end of the first door member, the latch mechanism being structured to secure the second end of the first door member to the electrical enclosure. The nose portion may have a first side, a second side, a top and a bottom. The first portion of the nose portion may be formed by the first side, the top and the bottom of the nose portion; and the second portion of the nose portion may be formed by the second side, the top and the bottom of the nose portion. The first door member may further comprise an opening through which the nose portion of the circuit breaker protrudes when the first door member is in the first position; and the second door member may comprise an opening through which the nose portion of the circuit breaker protrudes when the second door member is in the third position. The electrical enclosure may further include a cassette, wherein the first end of the second door member is structured to be pivotally coupled to the cassette.

As another aspect of the invention, an electrical cabinet assembly comprises: an electrical enclosure having an interior and an exterior; a number of conductors housed in the electrical enclosure; a circuit breaker including a nose portion having a first portion and a second portion, the circuit breaker being housed in the electrical enclosure; and a seal assembly. The seal assembly comprises: a first seal member movable from a first position wherein the first seal member is sealingly engaged with the first portion of the nose portion and a second position wherein the first seal member is spaced from the first portion of the nose portion; and a second seal member movable from a third position wherein the second seal member is sealingly engaged with the second portion of the nose portion and a fourth position wherein the second seal member is spaced from the second portion of the nose portion. When the first seal member is disposed in the first position and the second seal member is disposed in the third position, the seal assembly substantially seals all of the nose portion, thereby substantially sealing the interior of the electrical enclosure from the exterior of the electrical enclosure.

The circuit breaker may be movable between a first position in which the circuit breaker is in electrical contact with the number of conductors and a second position in which the circuit breaker is not in electrical contact with the number of conductors. The seal assembly may substantially seal all of the nose portion of the circuit breaker when the circuit breaker is disposed at or between the first and second positions, thereby substantially sealing the interior of the electrical enclosure from the exterior of the electrical enclosure.

The first seal member may comprise a door member having a first end and an opposite second end, the first end of the door member being pivotally coupled to the electrical enclosure; and the second seal member may comprise a panel member slidingly coupled to the door member at or near the opposite second end of the door member. The nose portion may further have a first side, a second side, a top and a bottom. The first portion of the nose portion may be formed by the first side, the top and the bottom of the nose portion; and the second portion of the nose portion may be formed by the second side of the nose portion. The door member may comprise a latch mechanism at or near the opposite second end of the door member. The latch mechanism may be structured to secure the opposite second end of the door member to the electrical enclosure and movement of the second seal member from the third position to the fourth position may be determined by the latch mechanism. The door member may further comprise an opening through which the nose portion of the circuit breaker protrudes when the door member is in the first position.

Alternately, the first seal member may comprise a first door member having a first end and an opposite second end, the first end of the door member being pivotally coupled to the electrical enclosure; and the second seal member may comprise a second door member having a first end and an opposite second end, the first end of the second door member being pivotally coupled to the electrical enclosure. The first door member may comprise a latch mechanism at or near the opposite second end of the first door member, the latch mechanism securing the second end of the first door member to the electrical enclosure. The nose portion may have a first side, a second side, a top and a bottom. The first portion of the nose portion may be formed by the first side, the top and the bottom of the nose portion; and the second portion of the nose portion may be formed by the second side, the top and the bottom of the nose portion. The first door member may further comprise an opening through which the nose portion of said circuit breaker protrudes when said first door member is in said first position; and wherein the second door member comprises an opening through which the nose portion of said circuit breaker protrudes when said second door member is in said third position. The electrical enclosure may further include a cassette; wherein the first end of the second door member is pivotally coupled to the cassette.

BRIEF DESCRIPTION OF THE DRAWINGS

A full understanding of the invention can be gained from the following description of the preferred embodiments when read in conjunction with the accompanying drawings in which:

FIG. 7 is an isometric view of a portion of the inner facing side of the seal assembly of FIG. 5 as seen looking outward from the electrical enclosure; and FIG. 8 is an isometric view of the seal assembly of FIG. 7 except modified to show the inside seal assembly in a secondary, sealing position.

DESCRIPTION OF THE PREFERRED EMBODIMENTS

Figure 1:
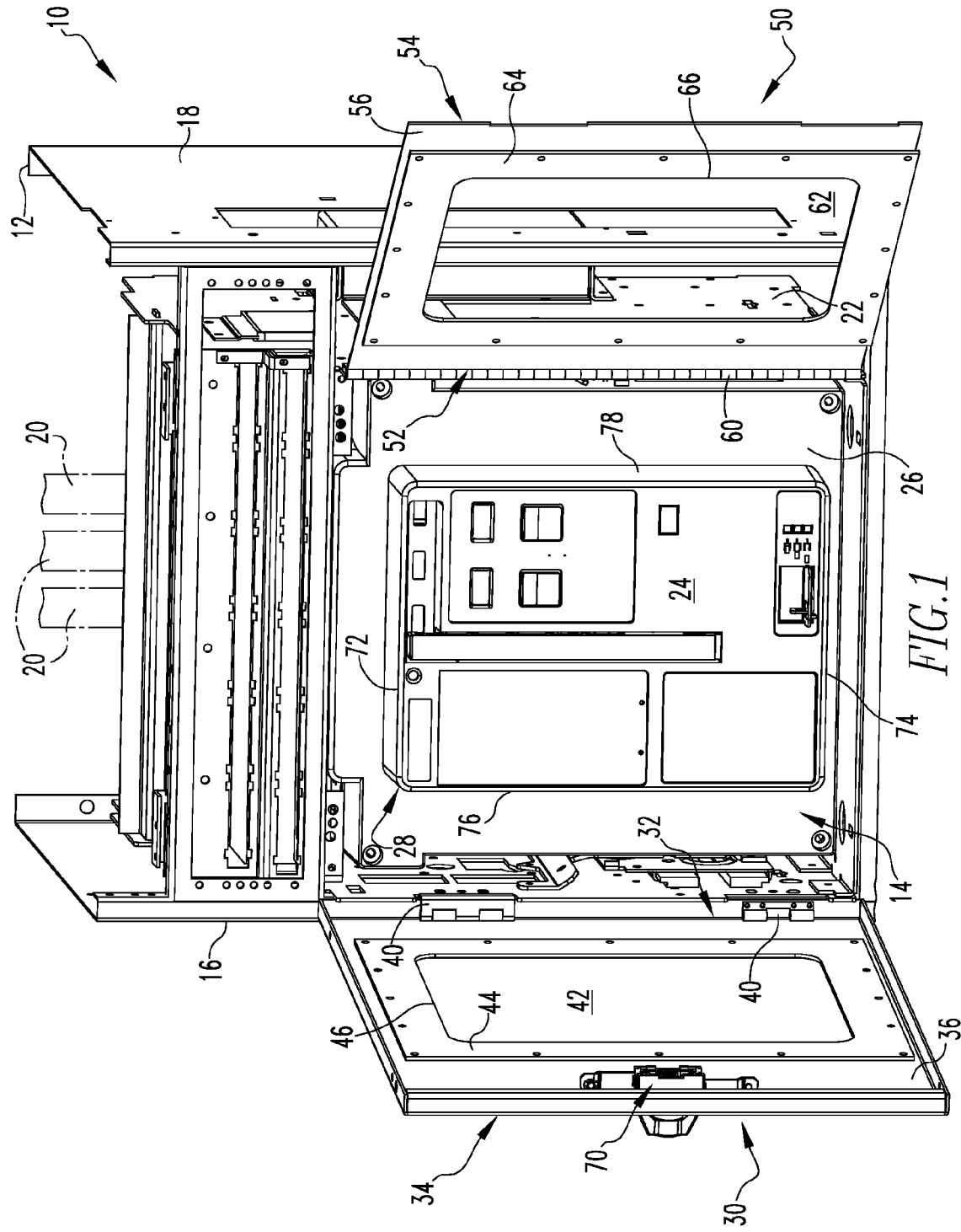
FIG. 1 is a front isometric view of a draw-out circuit breaker, and an electrical enclosure and seal assembly therefor, in accordance with an embodiment of the invention.

Directional phrases used herein, such as, for example, left, right, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" refers to the quantity one or an integer greater than one (i.e., a plurality).

As employed herein, the term "circuit breaker" refers to an electrical circuit breaker that may be drawn into and out of an enclosure (e.g., without limitation, switchgear cabinet), in which it is housed. Such a circuit breaker is also referred to as a "draw-out circuit breaker." A draw-out mechanism (e.g., without limitation, rollers; rails having linear bearings) facilitates the movement of the draw-out circuit breaker into and out of the enclosure.

Figure 2:
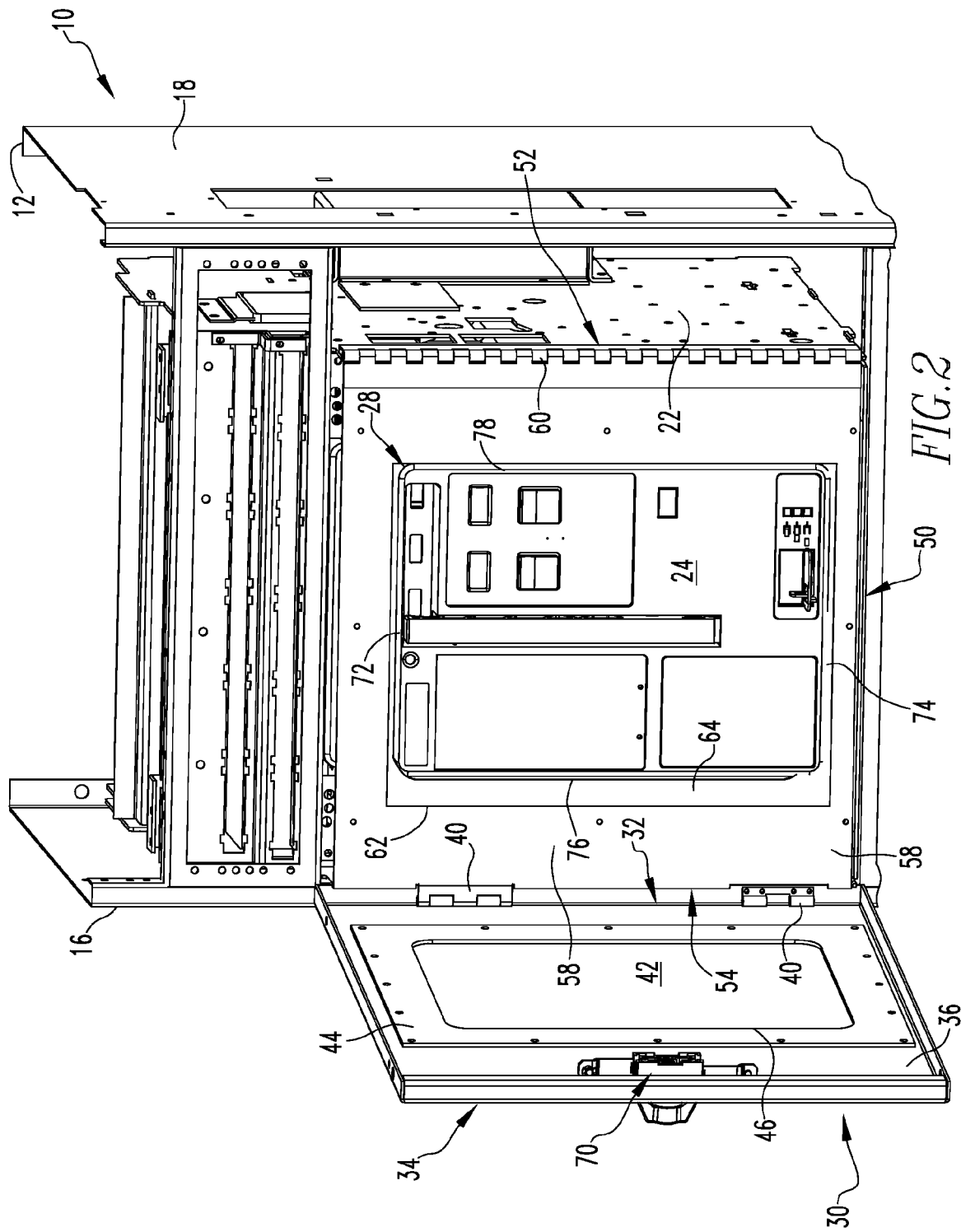
FIG. 2 is a front isometric view of the draw-out circuit breaker, and the electrical enclosure and seal assembly therefor of FIG. 1 with one of the seal members in a closed position.
Figure 3:
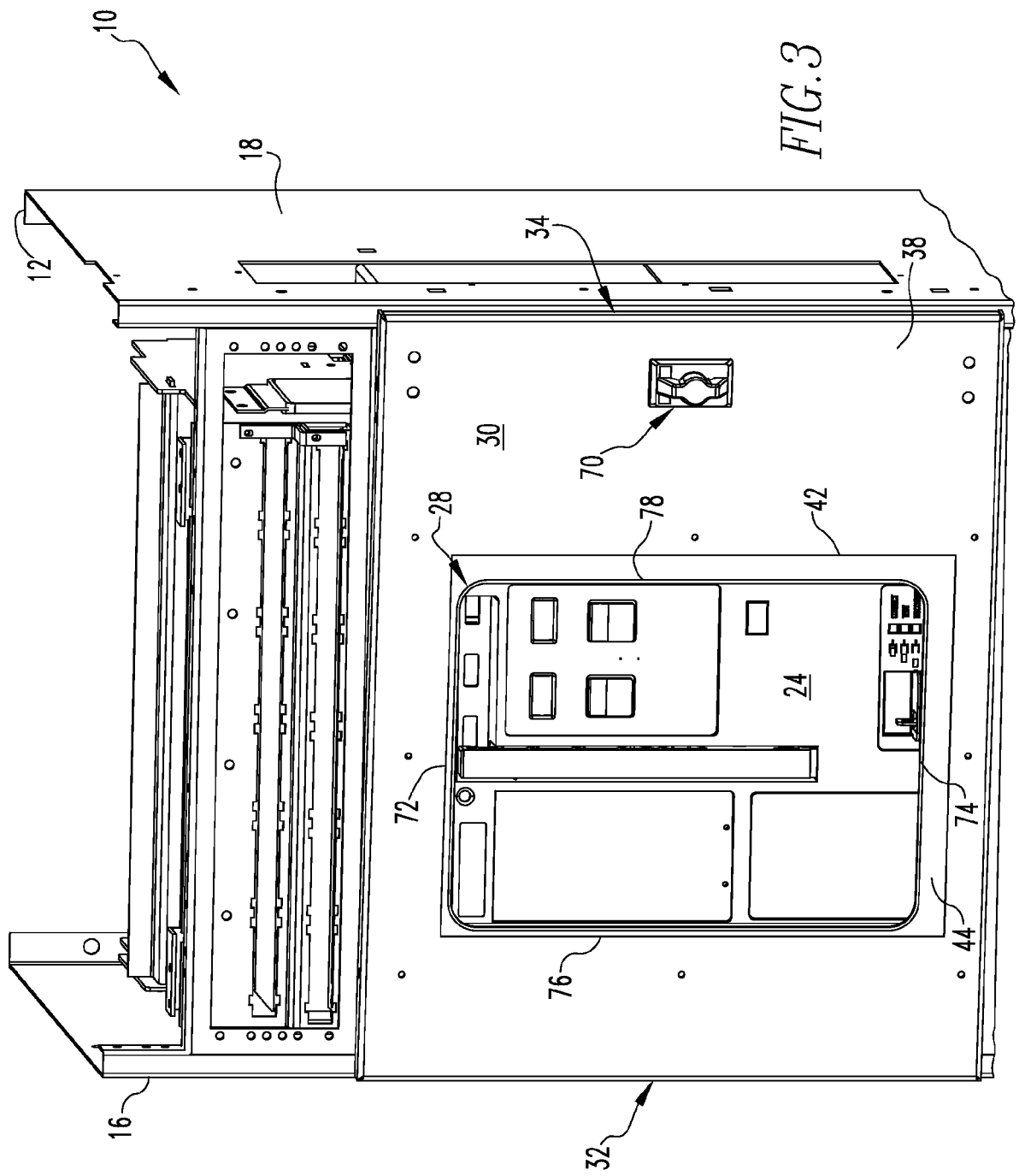
FIG. 3 is a front isometric view of the draw-out circuit breaker, and the electrical enclosure and seal assembly therefor of FIG. 2 with both of the seal members in the closed position.

FIGS. 1-3 show a portion of an electrical cabinet assembly 10 utilizing an example of the seal assembly (not numbered) of the present invention. A complete electrical cabinet assembly may contain one or more of the following combination of parts described. The electrical cabinet assembly 10 includes an electrical enclosure 12 having an interior and exterior defined by a front opening 14, a rear panel (not shown), a left side panel 16, a right side panel 18, and top and bottom panels (not shown). A number of conductors 20 (shown in simplified form in phantom line in drawing FIG. 1) are housed within the enclosure 12 generally near the rear panel. Further housed within the enclosure 12 generally near the front opening 14 is a cassette 22. Housed within the cassette 22 is a circuit breaker 24 having a front portion 26 and a rear portion (not shown). The circuit breaker 24 is generally movable a distance (not shown) between a first, racked-in position in which the rear portion of the circuit breaker 24 is in electrical contact with the number of conductors 20 and a second, racked out position in which the rear portion of the circuit breaker 24 is not in electrical contact with the number of conductors 20. Movement of the circuit breaker 24 between the first and second positions may be carried out through the use of a draw out mechanism (not shown). The circuit breaker 24 further includes a nose portion 28 protruding from the front portion 26 of the circuit breaker 24 in a direction generally away from the circuit breaker 24 and outward from the front opening 14 of the enclosure 12. Preferably, the nose portion 28 extends from the front portion 26 of the circuit breaker 24 a distance equal to, or greater than, the distance (not shown) traveled by the circuit breaker 24 between the first and second positions.

The electrical enclosure 12 further includes an outer door 30 and an inner door 50. The outer door 30 has a first end 32, a second end 34, an inner face 36, and an outer face 38 (FIG. 3). The first end 32 is pivotally coupled to the left side panel 16 of the enclosure 12 via a number of outer hinges 40. The inner door 50 has a first end 52, a second end 54, an inner face 56 and an outer face 58 (FIG. 2). The first end 52 is pivotally coupled to the cassette 22 via a number of hinges 60. It is to be appreciated that while the example shown in FIGS. 1-3 utilizes two hinges 40 and one hinge 60, one or more hinges or equivalent structures could be employed in place of these hinges 40,60.

In the example shown in FIGS. 1-3, the outer door 30 includes a latching mechanism 70 located generally at or near the second end 34 of the outer door 30. The latching mechanism 70 provides for the second end 34 of the outer door 30 to be secured to the enclosure 12 at or near the right side panel 18. Although an example latching mechanism 70 is shown, any suitable latching mechanism (e.g, locking; non-locking) may be employed.

Outer door 30 further includes an outer opening 42 which passes through the inner face 36 and outer face 38. The outer opening 42 is preferably of dimensions generally slightly larger than the corresponding dimensions of the nose portion 28 of the circuit breaker 24. Disposed on the inner face 36 of outer door 30 is an outer seal member 44 having an outer seal opening 46 generally aligned with outer opening 42. The outer seal opening 46 is preferably of dimensions generally less than the corresponding dimensions of the outer opening 42. Similarly, inner door 50 further includes an inner opening 62, which passes through the inner face 56 and outer face 58. The inner opening 62 is preferably of dimensions generally slightly larger than the corresponding dimensions of the nose portion 28 of the circuit breaker 24. Disposed on the inner face 56 of inner door 50 is an inner seal member 64 having an inner seal opening 66 generally aligned with inner opening 62. The inner seal opening 66 is preferably of dimensions generally less than the corresponding dimensions of the inner opening 62.

The number of hinges 40 allow the outer door 30 to be pivotable from a closed position (first position) shown in FIG. 3, in which the inner face 36 (along with the outer seal member 44) is closed against the outer face 58 of inner door 50 such that the nose portion 28 of the circuit breaker 24 extends through the outer seal opening 46 as well as the outer opening 42 of outer door 30, to an open position (second position) as shown in FIGS. 1 and 2. When the outer door 30 is in the open position such as shown in FIGS. 1 and 2, the number of hinges 60 allow the inner door 50 to be pivotable from a closed position (third position), best shown in FIG. 2, in which the inner face 56 adjacent the second end 54 is closed against the left side (not numbered) of cassette 22 and the inner seal 64 disposed on the inner face 56 is positioned with respect to the circuit breaker 24 such that nose portion 28 extends through the inner seal opening 66 as well as the inner opening 62 (of inner door 50), to an open position (fourth position) as shown in FIG. 1.

In the example shown in FIGS. 1-3, the example nose portion 28 is of generally rectangular shape and includes a top 72, a bottom 74, a left side 76, and a right side 78. As shown in FIG. 3, when the outer door 30 is in the closed position (first position), the outer opening 42 is slightly offset with respect to the nose portion 28 in a direction away from the number of hinges 40 (FIGS. 1 and 2) while the outer seal opening 46 (FIG. 1) is positioned with respect to the nose portion 28 such that the outer seal member 44 sealingly engages at least the left side 76, top 72 and bottom 74 of the nose portion 28. Similarly, as best shown in FIG. 2, when the inner door 50 is in a closed position (third position), the inner opening 62 is slightly offset with respect to the nose portion 28 in a direction away from the number of hinges 60 while the inner seal opening 66 (FIG. 1.) is positioned with respect to the nose portion 28 such that the inner seal member 64 sealingly engages at least the right side 78, top 72 and bottom 74 of the nose portion 28.

Positioning of both the inner door 50 and outer door 30 along with their respective seal members 44, 64 in the closed positions as shown in FIG. 3 substantially seals the nose portion 28 of the circuit breaker 24 with respect to the enclosure 12 and in doing so substantially seals the interior of the enclosure 12 from the exterior. It is to be appreciated that the resulting seal arrangement may be maintained when the circuit breaker 24 is positioned at the first position in which the rear portion of the electrical circuit breaker 24 is in electrical contact with the number of conductors 20, the second position in which the rear portion of the electrical circuit breaker 24 is not in electrical contact with the number of conductors 20, or at any position in between. As such, the seal arrangement described herein maintains a seal between the interior and exterior of the electrical enclosure 12 during initial electrical engagement of the circuit breaker 24 to the number of electrical conductors 20.

Figure 4:
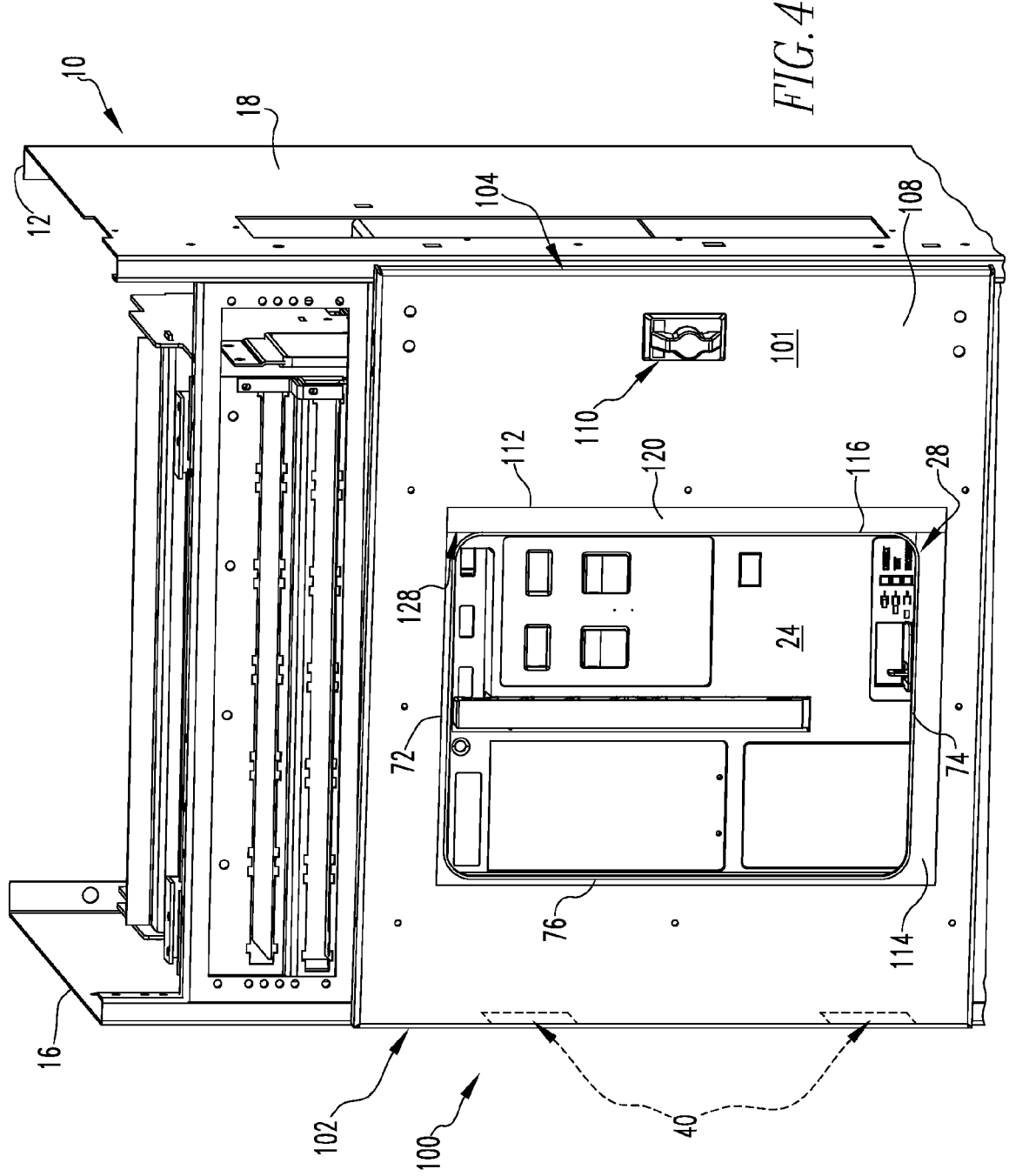
FIG. 4 is a front isometric view of a draw-out circuit breaker, and an electrical enclosure and seal assembly therefor, in accordance with another embodiment of the invention.

FIGS. 4-7 show a portion of an electrical cabinet assembly 10 utilizing another example of the seal assembly (not numbered) of the present invention. This seal assembly includes a door assembly 100 (FIG. 5) having a door 101 with a first end 102, a second end 104, an inner face 106 (FIGS. 5, 7, 8), and an outer face 108 (FIG. 4). The first end 102 is pivotally coupled to the left side panel 16 of the cabinet 12 via a number of outer hinges 40 (shown in hidden line drawing in FIG. 4). The door assembly 100 further includes a latching mechanism 110 located generally at or near the second end 104 of the door 100 and a sliding member 120 (FIGS. 5, 7, and 8) slidingly coupled to the inner face 106 of door 100. The latching mechanism 110 provides for the second end 104 of the door 100 to be secured to the cabinet 12 at or near the right side panel 18. Although an example latching mechanism 110 is shown, any suitable latching mechanism(e.g., locking; non-locking) may be employed.

Door 101 further includes an opening 112, which passes through the inner face 106 and outer face 108. The opening 112 is preferably of dimensions generally slightly larger than the corresponding dimensions of the nose portion 28 of the circuit breaker 24. Disposed on the inner face 106 of door 101 is a door seal member 114 having a seal opening 116 (FIG. 5) generally aligned with opening 112. The seal opening 116 is preferably of dimensions generally less than the corresponding dimensions of the opening 112 and sized such that door seal member 114 sealingly engages at least the left side 76, the top 72, and the bottom 74, of the nose portion 28.

Figure 5:
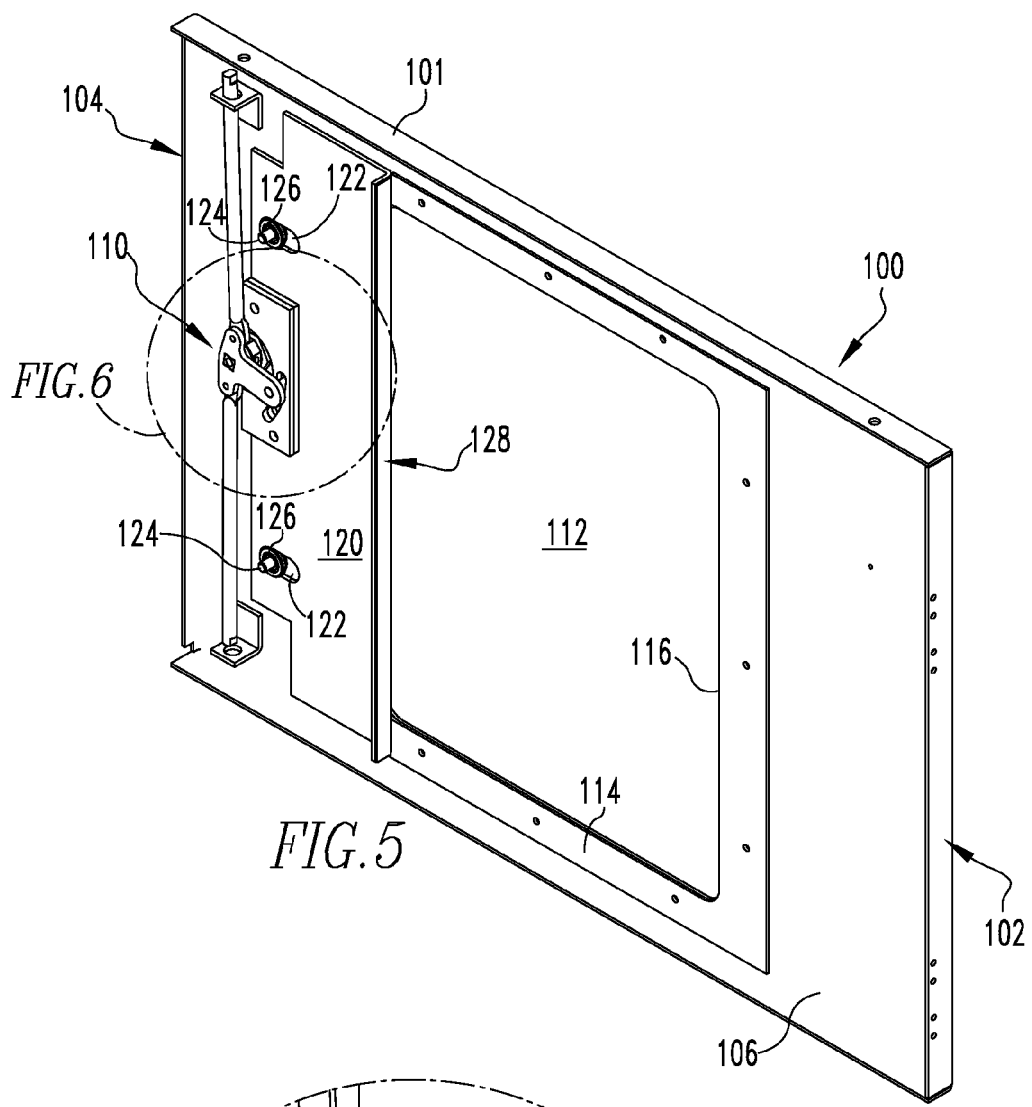
FIG. 5 is an isometric view of the inner facing side of a seal assembly in accordance with another embodiment of the invention.

As shown in FIGS. 5, 7, and 8, sliding member 120 includes a pair of slots 122, which interact with a corresponding pair of protrusions 124 that extend from the inner face 106 of the door 100 and terminate in a pair of retainers 126. Hence, the sliding member 120 can move in a direction parallel to the inner face 106 in a direction generally toward or away from the first end 102 or the second end 104. Although an example mounting mechanism is shown, any suitable mounting mechanism may be employed for the sliding member 120 and the door 100. Sliding member 120 further includes a sliding seal 128 disposed on a face of sliding member 120 generally perpendicular to the plane of the opening 112.

Figure 6:
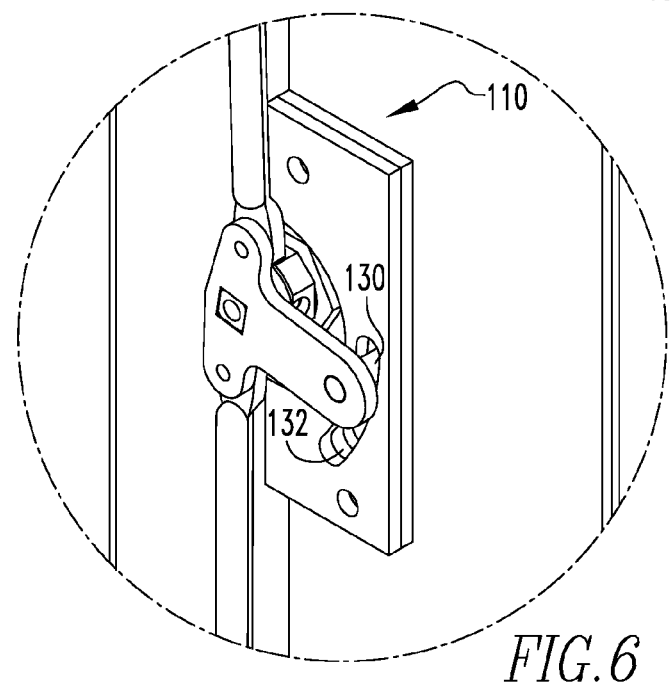
FIG. 6 is an isometric detail view of the noted section of FIG. 5.

As shown in FIGS. 6-8, the example latching mechanism 110 is mechanically coupled to sliding member 120 such that when latching mechanism 110 is moved from an unlatched position as shown in FIG. 7 to a latched position as shown in FIG. 8, sliding member 120 is displaced in a direction generally away from the second end 104 and toward the first end 102 of door 101. In the example shown, such mechanical coupling is accomplished through the interaction of a pin 130 of the latching mechanism 110 and an arcuate slot 132, however, it can be appreciated that other interactive couplings could be substituted while still meeting the needs of the present invention.

The number of hinges 40 allow the door assembly 100 to be movable from a closed position (shown in FIG. 4) in which the inner face 106 (along with seal member 114) is closed against a portion of the electrical enclosure 12 and that the nose portion 28 of circuit breaker 24 extends through the seal opening 116 as well as the opening 112 of door 100, to an open position (not shown) similar to the open door 30 of the previous example shown in FIGS. 1 and 2. As shown in FIG. 4, when the door assembly 100 is in the closed position, the opening 112 is slightly offset with respect to the nose portion 28 in a direction away from the number of hinges 40 while seal opening 116 is positioned with respect to the nose portion 28 such that the seal member 114 sealingly engages at least the left side 76, top 72 and bottom 74 of the nose portion 28.

FIG. 7 shows the door 101 in the closed position of FIG. 4 with the latching mechanism 110 in an unlatched position. In the unlatched position shown, it can be seen that sliding seal 128 of sliding member 120 is spaced from the right side 78 of nose portion 28 of the circuit breaker 24. When the latching mechanism 110 is moved to a latched position as shown in FIG. 8, it can be seen that sliding member 120 moves through the interaction of the pin 130 and arcuate slot 132 to bring sliding seal 128 into sealing engagement with the right side 78 of the protruding nose portion 28 of the circuit breaker 24. Therefore, when the door assembly is positioned in the closed position of FIG. 4 and latching mechanism 110 is in the latched position as shown in FIG. 8, the interior of the enclosure 12 is substantially sealed from the exterior. It is to be appreciated that the seal between the nose portion 28 of the circuit breaker 24, the seal member 114 and the sliding seal 120 may be maintained when the circuit breaker 24 is positioned at a first position in which the rear portion of the electrical circuit breaker 24 is in electrical contact with the number of conductors 20, a second position in which the rear portion of the electrical circuit breaker 24 is not in electrical contact with the number of conductors 20, or at any position in between. Such a seal arrangement maintains a seal between the interior and exterior of the electrical enclosure 12 during initial electrical engagement of the circuit breaker 24 to the number of electrical conductors 20.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A seal assembly for a circuit breaker structured to be housed in an electrical enclosure having an interior and an exterior, said circuit breaker including a nose portion having a first portion and a second portion, said seal assembly comprising:

a first seal member structured to be movable from a first position wherein said first seal member is sealingly engaged with the first portion of said nose portion and a second position wherein said first seal member is spaced from said first portion of said nose portion; and a second seal member structured to be movable from a third position wherein said second seal member is sealingly engaged with the second portion of said nose portion and a fourth position wherein said second seal member is spaced from said second portion of said nose portion;

wherein, when said first seal member is disposed in said first position and said second seal member is disposed in said third position, said seal assembly is structured to substantially seal all of said nose portion, thereby substantially sealing the interior of said electrical enclosure from the exterior of said electrical enclosure.

2. The seal assembly of claim 1, wherein said first seal member comprises a door member having a first end and an opposite second end, the first end of said door member being structured to be pivotally coupled to said electrical enclosure; and wherein said second seal member comprises a panel member slidingly coupled to said door member at or near the opposite second end of said door member.

3. The seal assembly of claim 2, wherein said nose portion further has a first side, a second side, a top and a bottom; wherein the first portion of said nose portion is formed by the first side, the top and the bottom of said nose portion; and wherein the second portion of said nose portion is formed by the second side of said nose portion.

4. The seal assembly of claim 3, wherein said door member comprises a latch mechanism at or near the opposite second end of said door member, said latch mechanism being structured to secure the opposite second end of said door member to said electrical enclosure; and wherein movement of said second seal member from said third position to said fourth position is determined by said latch mechanism.

5. The seal assembly of claim 4, wherein said door member further comprises an opening through which the nose portion of said circuit breaker protrudes when said door member is in said first position.

6. The seal assembly of claim 1, wherein said first seal member comprises a first door member having a first end and an opposite second end, the first end of said door member being structured to be pivotally coupled to said electrical enclosure; and wherein said second seal member comprises a second door member having a first end and an opposite second end, the first end of said second door member being structured to be pivotally coupled to said electrical enclosure.

7. The seal assembly of claim 6, wherein said first door member comprises a latch mechanism at or near the opposite second end of said first door member, said latch mechanism being structured to secure the second end of said first door member to said electrical enclosure.

8. The seal assembly of claim 6, wherein said nose portion further has a first side, a second side, a top and a bottom; wherein the first portion of said nose portion is formed by the first side, the top and the bottom of said nose portion; and wherein the second portion of said nose portion is formed by the second side, the top and the bottom of said nose portion.

9. The seal assembly of claim 8, wherein the first door member comprises an opening through which the nose portion of said circuit breaker protrudes when said first door member is in said first position; and wherein the second door member comprises an opening through which the nose portion of said circuit breaker protrudes when said second door member is in said third position.

10. The seal assembly of claim 6, wherein the electrical enclosure further includes a cassette; and wherein the first end of said second door member is structured to be pivotally coupled to said cassette.

11. The seal assembly of claim 1, wherein the electrical enclosure further has a number of conductors; wherein said circuit breaker is structured to be movable between a first position in which said circuit breaker is in electrical contact with said number of conductors and a second position in which said circuit breaker is not in electrical contact with said number of conductors; and wherein said seal assembly is structured to substantially seal all of the nose portion of said circuit breaker when said circuit breaker is disposed at or between said first and second positions, thereby substantially sealing the interior of said electrical enclosure from the exterior of said electrical enclosure.

12. An electrical cabinet assembly comprising:
an electrical enclosure having an interior and an exterior;
a number of conductors housed in said electrical enclosure;
a circuit breaker including a nose portion having a first portion and a second portion, said circuit breaker being housed in said electrical enclosure; and
a seal assembly comprising:
a first seal member movable from a first position wherein said first seal member is sealingly engaged with the first portion of said nose portion and a second position wherein said first seal member is spaced from said first portion of said nose portion, and
a second seal member movable from a third position wherein said second seal member is sealingly engaged with the second portion of said nose portion and a fourth position wherein said second seal member is spaced from said second portion of said nose portion;
wherein, when said first seal member is disposed in said first position and said second seal member is disposed in said third position, said seal assembly substantially seals all of said nose portion, thereby substantially sealing the interior of said electrical enclosure from the exterior of said electrical enclosure.

13. The electrical cabinet assembly of claim 12, wherein said circuit breaker is movable between a first position in which said circuit breaker is in electrical contact with said number of conductors and a second position in which said circuit breaker is not in electrical contact with said number of conductors; and wherein said seal assembly substantially seals all of the nose portion of said circuit breaker when said circuit breaker is disposed at or between said first and second positions, thereby substantially sealing the interior of said electrical enclosure from the exterior of said electrical enclosure.

14. The electrical cabinet assembly of claim 12, wherein said first seal member comprises a door member having a first end and an opposite second end, the first end of said door member being pivotally coupled to said electrical enclosure; and wherein said second seal member comprises a panel member slidingly coupled to said door member at or near the opposite second end of said door member.

15. The electrical cabinet assembly of claim 14, wherein said door member comprises a latch mechanism at or near the opposite second end of said door member, said latch mechanism being structured to secure the opposite second end of said door member to said electrical enclosure; and wherein movement of said second seal member from said third position to said fourth position is determined by said latch mechanism.

16. The electrical cabinet assembly of claim 15, wherein said door member further comprises an opening through which the nose portion of said circuit breaker protrudes when said door member is in said first position.

17. The electrical cabinet assembly of claim 12, wherein said first seal member comprises a first door member having a first end and an opposite second end, the first end of said door member being pivotally coupled to said electrical enclosure; and wherein said second seal member comprises a second door member having a first end and an opposite second end, the first end of said second door member being pivotally coupled to said electrical enclosure.

18. The electrical cabinet assembly of claim 17, wherein said first door member comprises a latch mechanism at or near the opposite second end of said first door member, said latch mechanism securing the second end of said first door member to said electrical enclosure.

19. The electrical cabinet assembly of claim 18, wherein said nose portion has a first side, a second side, a top and a bottom; wherein the first portion of said nose portion is formed by the first side, the top and the bottom of said nose portion; and the second portion of said nose portion is formed by the second side, the top and the bottom of said nose portion.

20. The electrical cabinet assembly of claim 19, wherein the first door member comprises an opening through which the nose portion of said circuit breaker protrudes when said first door member is in said first position; and wherein the second door member comprises an opening through which the nose portion of said circuit breaker protrudes when said second door member is in said third position.

21. The electrical cabinet assembly of claim 17, wherein the electrical enclosure further includes a cassette; and wherein the first end of said second door member is pivotally coupled to said cassette.

22. The electrical cabinet assembly of claim 20, wherein said circuit breaker is movable between a first position in which said circuit breaker is in electrical contact with said number of conductors and a second position in which said circuit breaker is not in electrical contact with said number of conductors; and wherein said seal assembly is structured to substantially seal all of the nose portion of said circuit breaker when said circuit breaker is disposed at or between said first and second positions, thereby substantially sealing the interior of said electrical enclosure from the exterior of said electrical enclosure.

23. The electrical cabinet assembly of claim 12, wherein said nose portion further has a first side, a second side, a top and a bottom; wherein the first portion of said nose portion is formed by the first side, the top and the bottom of said nose portion; and the second portion of said nose portion is formed by the second side of said nose portion.

* * * * *